United States Patent [19]

Beffa et al.

[11] 4,013,630
[45] Mar. 22, 1977

[54] CHROMIUM COMPLEX DISAZO DYES

[75] Inventors: Fabio Beffa, Riehen, Switzerland; Gerhard Back, Lorrach, Germany

[73] Assignee: Ciba-Geigy Corporation, Ardsley, N.Y.

[22] Filed: Mar. 2, 1976

[21] Appl. No.: 663,019

[30] Foreign Application Priority Data

Mar. 4, 1975  Switzerland .................. 2697/75

[52] U.S. Cl. .................. 260/145 A; 260/145 A
[51] Int. Cl.² .................. C09B 45/16
[58] Field of Search .................. 260/145 A

[56] References Cited

UNITED STATES PATENTS

| 2,933,488 | 4/1960 | Biedermann et al. | 260/145 A |
| 2,933,489 | 4/1960 | Biedermann et al. | 260/145 A |
| 3,756,771 | 9/1973 | Beffa | 260/145 A X |
| 3,975,369 | 8/1976 | Wicki | 260/145 A |

*Primary Examiner*—Allen B. Curtis
*Attorney, Agent, or Firm*—Karl F. Jorda; Edward McC. Roberts; Prabodh I. Almaula

[57] ABSTRACT

Chromium complex dyes of the formula

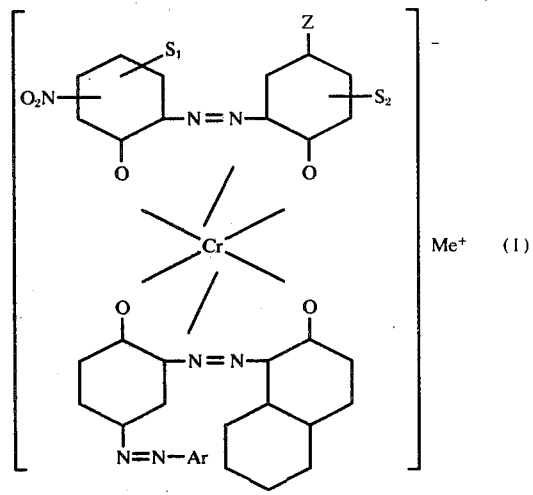

wherein

Z represents a phenyl radical, an alkyl radical of 4 to 12 carbon atoms, a cycloalkyl radical of 5 to 9 carbon atoms or an aralkyl radical of 7 to 12 carbon atoms, $S_1$ represents hydrogen, halogen, alkyl of 1 to 5 carbon atoms, alkoxy of 1 to 2 carbon atoms, nitro, alkanoylamino of 2 to 3 carbon atoms or alkoxycarbonylamino of 2 to 3 carbon atoms, $S_2$ represents hydrogen, alkyl of 1 to 5 carbon atoms, alkanoylamino or alkoxycarbonylamino, each of 2 to 3 carbon atoms, $Me^+$ represents a cation, and Ar represents the radical of an aromatic or a heterocyclic diazo component which contains 1 to 3 $SO_3H$ groups and is optionally further substituted by carboxy, halogen, alkyl of 1 to 5 carbon atoms, alkoxy of 1 to 2 carbon atoms or nitro.

6 Claims, No Drawings

CHROMIUM COMPLEX DISAZO DYES

The present invention provides chromium complex dyes of the formula

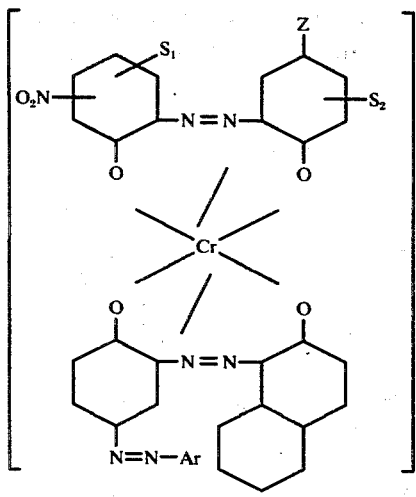

wherein
Z represents a phenyl radical, an alkyl radical of 4 to 12 carbon atoms, a cycloalkyl radical of 5 to 9 carbon atoms or an aralkyl radical of 7 to 12 carbon atoms, $S_1$ represents hydrogen, halogen, alkyl of 1 to 5 carbon atoms, alkoxy of 1 to 2 carbon atoms, nitro, alkanoylamino of 2 to 3 carbon atoms or alkoxycarbonylamino of 2 to 3 carbon atoms, $S_2$ represents hydrogen, alkyl of 1 to 5 carbon atoms, alkanoylamino or alkoxycarbonylamino, each of 2 to 3 carbon atoms, $Me^+$ represents a cation, and Ar represents the radical of an aromatic or a heterocyclic diazo component which contains 1 to $SO_3H$ groups and is optionally further substituted by carboxy, halogen, alkyl of 1 to 5 carbon atoms, alkoxy of 1 to 2 carbon atoms or nitro.

Ar is herein primarily a naphthalene or benzene radical which carries 1 to 3, preferably 1 or 2, sulpho groups and is optionally further substituted by chlorine, nitro, alkyl of 1 to 5 carbon atoms or alkoxy of 1 to 2 carbon atoms. The term "halogen" denotes fluorine and, above all, chlorine and bromine.

The new dyes are obtained by reacting an azo dye of the formula

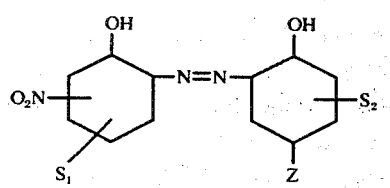

or a disazo dye of the formula

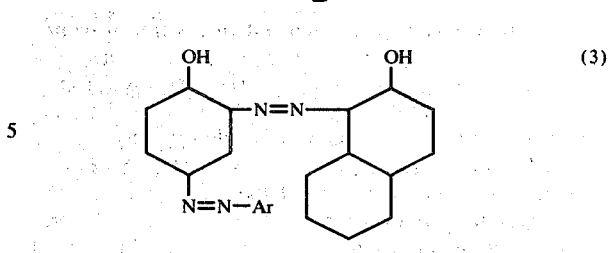

with a chromium donor to give the 1:1 chromium complex, which is subsequently reacted with the non-metallised dye of the formula (3) or (2) to give the 1:2 chromium complex. Preferably the 1:1 chromium complex of the azo dye of the formula (2) is manufactured and then reacted with the disazo dye of the formula (3).

Instead of containing hydroxyl groups, the starting dyes of the formula (2) or (3) can also contain groups from which hydroxyl groups are formed during the chroming, for example low molecular alkoxy groups, in particular methoxy groups.

The monoazo compounds of formula (2) can be obtained in conventional manner by coupling a 1-hydroxy- or 1-alkoxy-2-aminonitrobenzene to a phenol as defined herein. Examples of such phenols are: p-tert. butylphenol, p-n-butylphenol, p-isobutylphenol, p-tert. amylphenol, p-hexylphenol, p-cyclohexylphenol, p-octylphenol, p-hydroxydiphenyl and 2-phenyl-2-(p-hydroxyphenyl)-propane. In preferred monoazo compounds of the formula (2), Z represents an alkyl radical of 4 to 8 carbon atoms, $S_1$ represents hydrogen, chlorine, nitro or methyl, and $S_2$ represents hydrogen, acetylamino, methoxycarbonylamino or methyl.

The disazo dyes of the formula (3) are obtained by coupling, for example, the diazonium compound of an amine Ar-$NH_2$ with a 1-hydroxy-2-aminobenzene whose amino group is protected by acylation. The azo dye obtained is then diazotised after liberation of the amino group by saponification and coupled to β-naphthol. Suitable arylamines of the formula Ar-$NH_2$ are, for example, 2-, 3- or 4-sulphoaniline, 4-methyl-2- or -3-sulphoaniline, 4-chloro-3-sulphoaniline, 4-nitro-2-sulphoaniline, 4-methoxy-3-sulphoaniline, 4,8-disulpho-β-naphthylamine, 6,8-disulpho-β-naphthylamine, α-naphthylamine-4-, -6- or -8-sulphonic acid etc. Heterocyclic amines, such as 2-aminobenzthiazole, are also suitable.

The conversion of the azo dye of the formula (2) or (3) into the 1:1 chromium complex is carried out by conventional methods which are known per se, for example by reacting it in an acid medium with a salt of trivalent chromium, for example chromium formiate, chromium sulphate, chromium chloride hexahydrate or chromium fluoride, at boiling temperature or, where appropriate, at temperatures exceeding 100° C. Trivalent chromium can also be obtained in the reaction mixture from chromium (VI) compounds, for example chromate, by simultaneously adding a reducing agent. The metallising can be carried out in an aqueous, aqueousorganic or organic medium.

The reaction of the 1:1 chromium complex of the dye of formula (2) or (3) with a dye of the formula (3) (2) is advantageously carried out in a neutral to weakly alkaline medium, in an open or closed apparatus, at elevated temperature, for example at temperatures between 50° and 120° C.

The process can be carried out in organic solvents, for example alcohols or ketones or in an aqueous solution, in which case, where appropriate, the addition of solvents, for example of alcohols, formamide etc., can promote the reaction. It is usually advisable to react as far as possible equivalent amounts of the chromium-containing 1:1 complex and of the metal-free dye, the molecular ratio between metal-free dye and 1:1 complex advantageously being at least 0.85:1 and at most 1:0.85.

The chromium-containing mixed complexes of the present invention which are obtained by the above process are isolated with advantage in the form of their salts, in particular their alkali salts, above all, sodium salts or also ammonium salts. They are suitable for dyeing and printing nitrogen-containing material such as wool, silk, synthetic polyamide and, in particular, for dyeing leather. The dyes containing 1 to 2 sulpho groups are suitable above all for dyeing wool, silk and synthetic polyamide; and the leather dyes can contain 1 to 3 sulpho groups. Brown shades of good covering power are obtained. The dyes give level dyeings with good fastness to light, washing, water, perspiration, alkali, acid, diffusion and rubbing.

The following Examples illustrate the invention, the parts and percentages being by weight unless otherwise indicated.

EXAMPLE 1

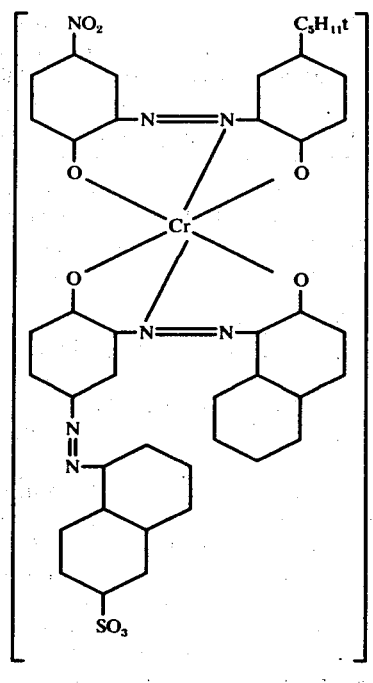

32.9 parts of the monoazo dye obtained from diazotised 4-nitro-2-amino-1-hydroxybenzene and para-tertiary amylphenol are suspended in 500 parts by volume of n-butanol. After addition of 26.65 parts of chromium chloride hexahydrate the mixture is stirred at 110°– 115° C and the water that forms is separated off as an azeotrope. The chroming is terminated after 3 – 4 hours. To the dyestuff solution are then added 49.8 parts of the disazo dye obtained from diazotised 3-amino-4-hydroxyazobenzene-(1')-naphthalene-6'-sulphonic acid and 2-hydroxynaphthalene and 30 parts of calcined sodium carbonate and stirring is continued for a further 1 – 2 hours at 110°– 117° C. Upon termination of the reaction, the reaction mixture is filtered clear, if necessary, and evaporated to dryness. The product is a brownish black powder which dissolves in water and dyes leather, wool or polyamide material from a neutral to weakly acid bath in brown shades of good fastness properties.

EXAMPLE 2

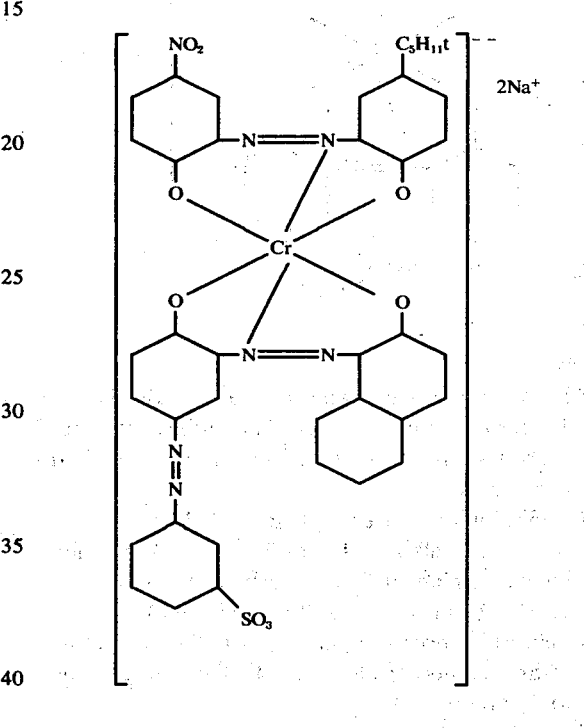

32.9 parts of the monoazo dye obtained from diazotised 4-nitro-2-amino-1-hydroxybenzene and para-tertiary amylphenol are stirred with 26.65 parts of chromium chloride hexahydrate in 500 parts by volume of ethylene glycol at 120°– 125° C until the starting compound can no longer be detected. To the solution of the 1:1 chromium complex dye are then added 44.8 parts of the disazo dye obtained from diazotised 3-amino-4-hydroxybenzene-3'-sulphonic acid and 2-hydroxynaphthalene and 80 parts by volume of sodium carbonate solution (20%) and stirring is continued for a further 1 – 2 hours at 80° – 85° C to effect addition. Upon termination of the reaction the asymmetrical chromium-containing dye is precipitated by addition of saturated sodium chloride solution, filtered off and dried. It is a brownish black powder which dissolves in water with a brown colour and dyes wool or polyamide material as well as leather from a weakly acid bath in brown shades of generally good fastness properties.

EXAMPLE 3

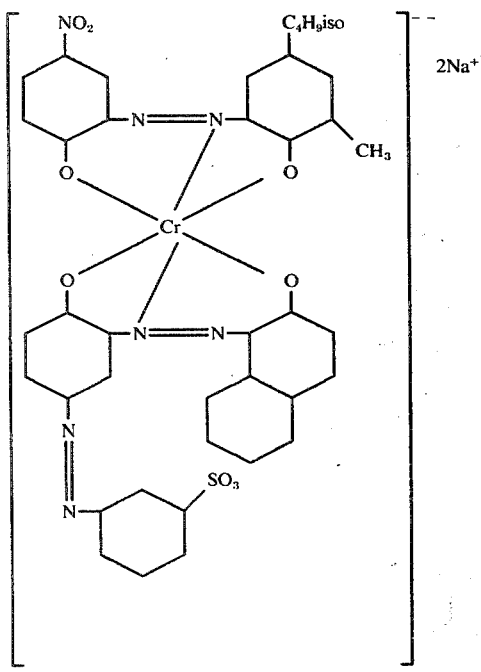

32.9 parts of the monoazo dye obtained from diazotised 4-nitro-2-amino-1-hydroxybenzene and 2-methyl-4-isobutylphenol are stirred with 26.65 parts of chromium chloride hexahydrate in 500 parts by volume of ethylene glycol at 120° – 125° C until the starting compound can no longer be detected. To the solution of the 1:1 chromium complex due are then added 44.8 parts of the disazo dye obtained from diazotised 3-amino-4-hydroxyazobenzene-3'-sulphonic acid and 2-hydroxynaphthalene and 80 parts by volume of sodium carbonate solution (20%) and stirring is continued at 80° – 85° C for a further 1 to 2 hours to effect addition. Upon termination of the reaction the asymmetrical chromium-containing dye is precipitated by addition of saturated sodium chloride solution, filtered off and dried. It is a brownish black powder which dissolves in water with a brown colour and dyes wool or polyamide material as well as leather from a weakly acid bath in brown shades of generally good fastness properties.

Brown dyes with similar properties are obtained by reacting the monoazo and disazo dyes listed in the following table as described in Examples 1 to 3 to give asymmetrical 1:2 chromium complexes.

| No. | Monoazo dye: | Disazo dye: |
|---|---|---|
| 1 | OH–C₆H₃(NO₂)–N=N–C₆H₃(OH)(C₄H₉) | OH–C₆H₃–N=N–naphthyl(OH); with –N=N–C₆H₄–SO₃H substituent |
| 2 | OH–C₆H₃(NO₂)–N=N–C₆H₃(OH)(C₅H₁₁t) | OH–C₆H₃–N=N–naphthyl(OH); with –N=N–C₆H₄–SO₃H substituent |

-continued
| No. | Monoazo dye: | Disazo dye: |
|---|---|---|
| 3 | '' | 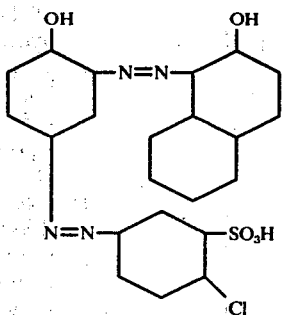 |
| 4 | '' | 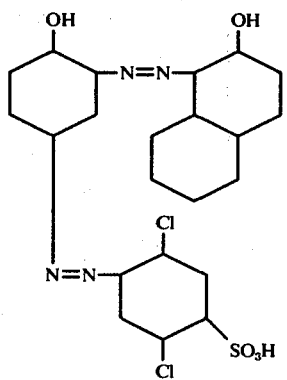 |
| 5 | '' | 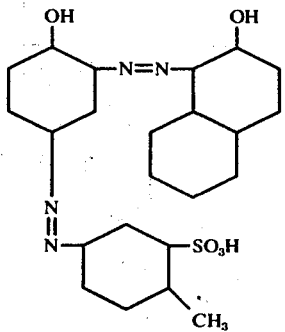 |
| 6 | '' | 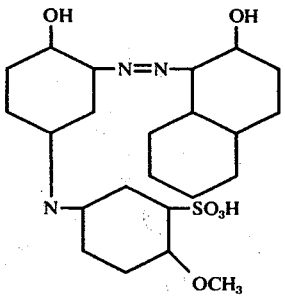 |

| No. | Monoazo dye: | Disazo dye: |
|---|---|---|
| 7 | " | 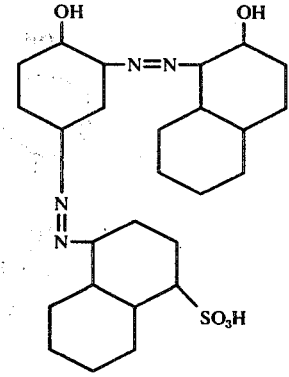 |
| 8 | " | 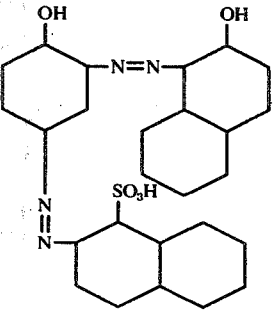 |
| 9 | " | 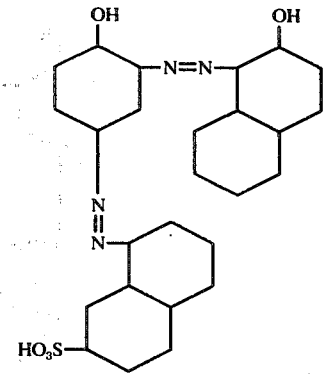 |
| 10 | " | 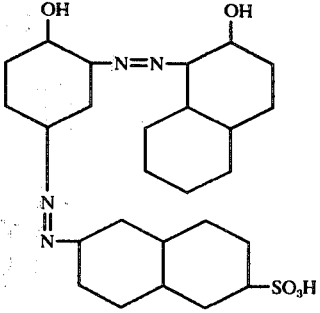 |

-continued
| No. | Monoazo dye: | Disazo dye: |
|---|---|---|
| 11 | " | 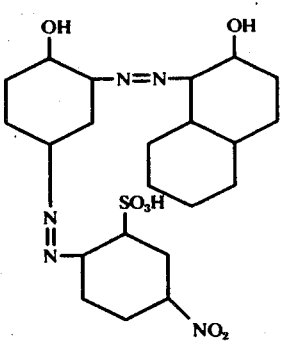 |
| 12 | " | 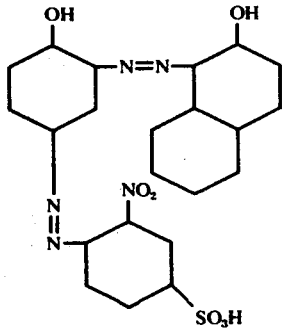 |
| 13 | " | 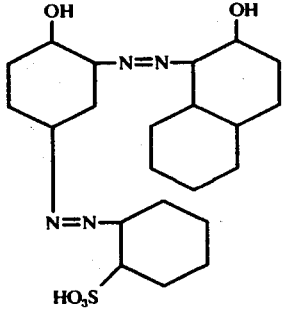 |
| 14 | " | 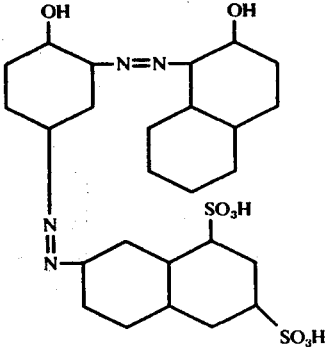 |

-continued

| No. | Monoazo dye: | Disazo dye: |
|---|---|---|
| 15 | (structure) | (structure) |
| 16 | (structure) | (structure) |
| 17 | (structure) | ″ |
| 18 | (structure) | ″ |
| 19 | (structure) | ″ |
| 20 | (structure) | ″ |
| 21 | (structure) | ″ |

-continued

| No. | Monoazo dye: | Disazo dye: |
|---|---|---|
| 22 | (structure: 2-hydroxy-5-nitrophenyl–N=N–2-hydroxy-3-acetamido-5-n-butylphenyl) | ″ |
| 23 | (structure: 2,6-dimethoxy-4-nitrophenyl–N=N–2-hydroxy-5-t-amylphenyl) | (disazo structure with OH, naphthyl, and SO$_3$H groups) |
| 24 | (structure: 2-hydroxy-5-nitrophenyl–N=N–2-hydroxy-5-t-amylphenyl) | (disazo structure with OH, naphthyl, and two SO$_3$H groups) |
| 25 | ″ | (disazo structure with OH, naphthyl, and 8-aminoquinoline-5-sulfonic acid) |
| 26 | (structure: 2-hydroxy-5-nitrophenyl–N=N–2-hydroxy-5-n-butylphenyl) | (disazo structure with OH, naphthyl, and SO$_3$H groups) |

| No. | Monoazo dye: | Disazo dye: |
|---|---|---|
| 27 | " | 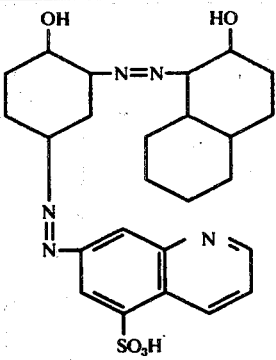 |
| 28 | 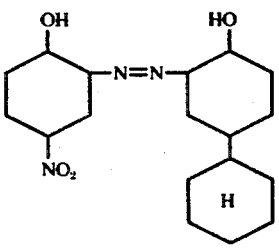 | 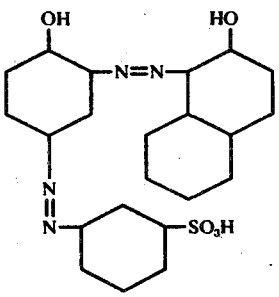 |
| 29 | 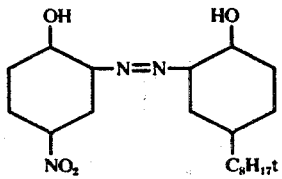 | " |
| 30 | 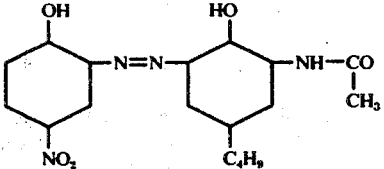 | " |
| 31 | 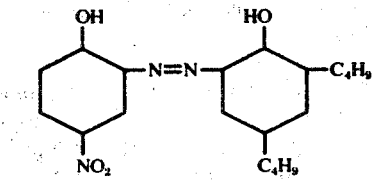 | " |
| 32 | 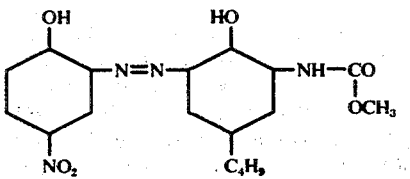 | " |
| 33 | 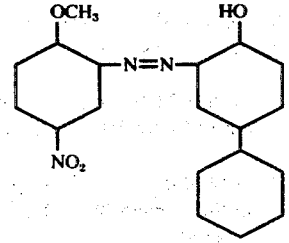 | " |

| No. | Monoazo dye: | Disazo dye: |
|---|---|---|
| 34 | [structure: OH-phenyl-N=N-phenyl-OH with NO₂ and C₅H₁₁t substituents] | [structure: OH-phenyl-N=N-naphthyl-OH with additional N=N-naphthalene-SO₃H/HO₃S/SO₃H group] |

$$\begin{bmatrix} \text{[chromium complex structure with O}_2\text{N, S}_1\text{, Z, S}_2 \text{ substituents, two azo-ligands coordinated to Cr, with N=N-Ar group]} \end{bmatrix}^- \quad Me^+ \qquad (1)$$

Dyeing Procedure for Wool 100 parts of wool yarn are put at 50° C into a dyebath which contains 2 parts of the dye of Example 3, 4 parts of ammonium sulphate and 2 parts of a levelling agent in 4000 parts of water. The liquor is brought to the boil in the course of 45 minutes and kept thereat for a further 45 minutes. The goods are then removed from the bath, thoroughly rinsed with cold water and dried.

Dyeing Procedure for Leather 100 parts of clothing velours leather (dry weight) are wet back at 50° C for 2 hours in a solution of 1000 parts of water and 2 parts of 24% ammonia and subsequently dyed for 1 hour at 60° C in a solution of 1000 parts of water, 2 parts of 24% ammonia and 6 parts of the dye of Example 1. A solution of 40 parts of water and 4 parts of formic acid (85%) is then added and dyeing is continued for a further 30 minutes. The leather is then thoroughly rinsed and, if appropriate, treated for 30 minutes at 50° C with 2 parts of a dicyandiamine/formaldehyde condensation product. Other kinds of velour leather as well as glove leather can be dyed in the same manner.

We claim:
1. Chromium complex dyes of the formula wherein
    Z represents a phenyl radical, an alkyl radical of 4 to 12 carbon atoms, a cycloalkyl radical of 5 to 9 carbon atoms or an aralkyl radical of 7 to 12 carbon atoms, $S_1$ represents hydrogen, halogen, alkyl of 1 to 5 carbon atoms, alkoxy of 1 to 2 carbon atoms, nitro, alkanoylamino of 2 to 3 carbon atoms or alkoxycarbonylamino of 2 to 3 carbon atoms,
    $S_2$ represents hydrogen, alkyl of 1 to 5 carbon atoms, alkanoylamino or alkoxycarbonylamino, each of 2 to 3 carbon atoms,
    $Me^+$ represents a cation, and
    Ar represents the radical of an aromatic diazo component which contains 1 to 3 $SO_3H$ groups and is optionally further substituted by carboxy, halogen, alkyl of 1 to 5 carbon atoms, alkoxy of 1 to 2 carbon atoms or nitro.

2. Chromium complex dyes according to claim 1, wherein Ar is a naphthalene or benzene radical which carries one to three sulpho groups and is optionally substituted in addition by chlorine, nitro, alkyl of 1 to 5 carbon atoms or alkoxy of 1 to 2 carbon atoms.

3. Chromium complex dyes according to claim 1, wherein Ar carries one or two sulpho groups.

4. Chromium complex dyes according to claim 1, wherein Z represents an alkyl radical of 4 to 8 carbon atoms.

5. Chromium complex dyes according to claim 1, wherein $S_1$ represents hydrogen, chlorine, nitro or methyl.

6. Chromium complex dyes according to claim 1, wherein $S_2$ represents hydrogen, acetylamino, methoxycarbonylamino or methyl.

* * * * *